(12) United States Patent
Davis et al.

(10) Patent No.: US 11,084,970 B2
(45) Date of Patent: Aug. 10, 2021

(54) ADDITIVE TO DECREASE THE POUR POINT OF PARAFFIN INHIBITORS

(71) Applicant: Multi-Chem Group. LLC, San Angelo, TX (US)

(72) Inventors: Nathan D. Davis, Conroe, TX (US); Qiang Lan, The Woodlands, TX (US); Ying Cong Jiang, Pearland, TX (US); Kiran Gawas, Humble, TX (US); Janet L. Ngo, Cypress, TX (US)

(73) Assignee: MULTI-CHEM GROUP, LLC, San Angelo, TX (US)

( * ) Notice: Subject to any disclaimer, the term of this patent is extended or adjusted under 35 U.S.C. 154(b) by 0 days.

(21) Appl. No.: 16/645,643

(22) PCT Filed: Dec. 4, 2017

(86) PCT No.: PCT/US2017/064491
§ 371 (c)(1),
(2) Date: Mar. 9, 2020

(87) PCT Pub. No.: WO2019/112550
PCT Pub. Date: Jun. 13, 2019

(65) Prior Publication Data
US 2020/0277526 A1   Sep. 3, 2020

(51) Int. Cl.
*E21B 37/06* (2006.01)
*C09K 8/524* (2006.01)

(52) U.S. Cl.
CPC .............. *C09K 8/524* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 4,668,408 A * | 5/1987 | McClaflin | C09K 8/524 166/304 |
| 6,309,431 B1 | 10/2001 | Becker et al. | |
| 7,541,315 B2 | 6/2009 | Jennings | |
| 2004/0058827 A1 | 3/2004 | Jennings | |
| 2005/0085676 A1 * | 4/2005 | Panchalingam | C10L 1/10 585/15 |

(Continued)

FOREIGN PATENT DOCUMENTS

WO   2016137922 A1   9/2016
WO   2019006004 A1   1/2019

OTHER PUBLICATIONS

International Search Report and Written Opinion dated Aug. 20, 2018: International PCT Application No. PCT/US2017/064491.

*Primary Examiner* — Andrew Sue-Ako
(74) *Attorney, Agent, or Firm* — McGuireWoods, LLP

(57) ABSTRACT

Included are compositions, methods, and systems for producing and using winterized paraffin inhibitor solutions. An example composition comprises a paraffin inhibitor solution; and an additive comprising a first portion and a second portion; wherein the first portion is selected from the functional groups consisting of sulfo, phosphate, phosphonate, ester, carboxyl, hydroxyl, and any combination thereof; wherein the second portion is selected from the functional groups consisting of linear alkyl, branched alkyl, alkyl phenyl, ethoxylated branched alkyl, propoxylated branched alkyl, and any combination thereof.

20 Claims, 1 Drawing Sheet

(56) References Cited

U.S. PATENT DOCUMENTS

| | | |
|---|---|---|
| 2007/0051033 A1 | 3/2007 | Martin et al. |
| 2007/0062101 A1 | 3/2007 | Delamotte |
| 2010/0130385 A1 | 5/2010 | Guzmann |
| 2015/0068950 A1* | 3/2015 | See .................... B01D 11/0288 208/13 |
| 2015/0119301 A1* | 4/2015 | McDaniel .............. C09K 8/805 507/224 |
| 2017/0190949 A1* | 7/2017 | Solomon ................ C10G 75/04 |
| 2020/0224113 A1 | 7/2020 | Li et al. |

\* cited by examiner

ADDITIVE TO DECREASE THE POUR POINT OF PARAFFIN INHIBITORS

TECHNICAL FIELD

The present disclosure relates to the use of an additive for winterizing paraffin inhibitors in solution, and more particularly, to the use of an additive that winterizes paraffin inhibitors in solution by reducing their pour point without molecular modification of the paraffin inhibitor or creating a suspension of solid paraffin inhibitor particulates.

BACKGROUND

Some types of hydrocarbon fluids contain dissolved paraffin. During exploration and/or production, paraffin may precipitate on to wellbore components because of changing wellbore temperature and pressure. Paraffin build-up can damage these wellbore components as well as the formation. In some circumstances, paraffin build-up may restrict production. Paraffin inhibitors may be used to prevent and reduce paraffin deposition in wellbores and upstream transport equipment such as pipelines and transport containers. These paraffin inhibitors are typically provided as solutions that may be injected into the wellbore or transport equipment. Paraffin inhibitors may include comb shape polymers having linear or branched side chains. These side chains may be capable of packing close together to form crystals at low temperatures. At said low temperatures, the paraffin inhibitor solutions may phase separate and form gels and/or fully solidify. When this occurs, the paraffin inhibitor is unable to flow. As such, the crystallization or phase separation of the paraffin inhibitor can limit its use in low temperature regions. For example, a paraffin inhibitor with a pour point of 28° F. would require insulation or heating to be used at temperatures of 28° F. or less.

Current methods for winterizing the paraffin inhibitors include solidifying the paraffin inhibitors and then preparing them as suspensions or dispersions. Alternatively, the paraffin inhibitors may be mixed with a variety of solvents to keep them in solution. Some methods modify the structure of the paraffin inhibitor molecules to keep them in solution. However, these methods are not without drawbacks. For example, the paraffin inhibitor may need to be molecularly modified which may reduce its efficacy. For example, modifying the paraffin inhibitor's molecular structure can reduce its efficiency. In other examples, the paraffin inhibitor may be induced to form solid particulates, which may increase manufacturing cost and can necessitate remixing the paraffin inhibitor in some circumstances. In still other examples, the chosen winterization method does not reduce the pour point of the paraffin inhibitor to the desired temperature needed for use in some low-temperature environments. In yet other examples, the chosen winterization method requires relatively expensive supplies and modification of the liquid solutions in which the paraffin inhibitors are provided.

As such, the inability to prevent and reduce paraffin deposition in low temperature environments may result in damage to the well equipment, the formation, and reduce production. Further, this damage can result in the operation incurring additional expenses and a loss in productive time.

BRIEF DESCRIPTION OF THE DRAWINGS

Illustrative examples of the present disclosure are described in detail below with reference to the attached drawing figures, which are incorporated by reference herein, and wherein.

Figure 1:
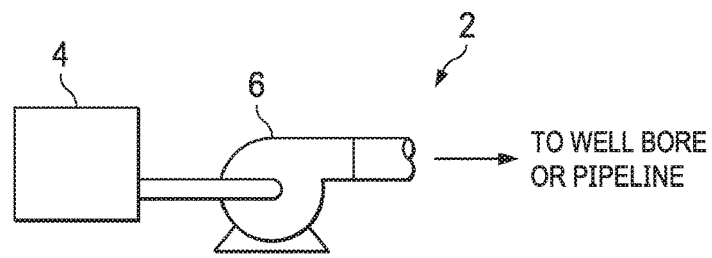
FIG. 1 is a schematic illustrating mixing and pumping equipment used in the preparation and injection of a winterized paraffin inhibitor solution in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of an additive for winterizing paraffin inhibitors in solution, and more particularly, to the use of an additive that winterizes paraffin inhibitors in solution by reducing their pour point without molecular modification of the paraffin inhibitor or creating a suspension of solid paraffin inhibitor particulates.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the compositions, methods, and systems described herein relate to the use of additives to winterize paraffin inhibitors in solution by reducing their pour point. As used herein, the "pour point" is the temperature at which a liquid is unable to flow. The pour point, as measured in the examples of this disclosure, was determined by placing a solution at various temperatures for at least 24 hours. The pour point was the lowest temperature at which the solution can still flow. One of the many potential advantages of the disclosed additives is that they interact with, but do not molecularly modify the composition of the paraffin inhibitor. As such, the paraffin inhibitor maintains its effectiveness. Another potential advantage is that the additives may be added to the paraffin inhibitor solution and used as is. Yet a further advantage is that the paraffin inhibitor does not need to be solidified, dispersed in suspension/dispersion, or otherwise induced into a phase transition in order to be winterized. Yet another potential advantage is that the disclosed additives may reduce the pour point of the paraffin inhibitor to a sufficient temperature threshold that the paraffin inhibitor may be used in a target low temperature wellbore or piece of transport equipment. One more additional advantage is that the disclosed additives are relatively cost-effective solutions for winterizing paraffin inhibitors as compared to other solutions.

In all examples, the additive comprises a first portion and a second portion. The first portion comprises at least one polar functional group. Examples of the polar functional groups of the first portion include, but are not limited to, sulfonic, carboxyl, phosphate, phosphonate, ester, or hydroxyl functional groups. In some examples, a combination of polar functional groups may be used for the first portion. Examples of the functional groups of the second portion include, but are not limited to, linear alkyl, branched alkyl, alkyl phenyl, ethoxylated branched alkyl, or propoxylated branched alkyl functional groups. In some examples, a combination of functional groups may be used for the second portion. In some examples, the additive consists essentially of the first portion and the second portion. Specific examples of the additive include, but are not limited to, dodecylbenzenesulfonic acid, nonylphenol, methanesulfonic acid, ethanesulfonic acid, derivatives thereof, or any combination thereof. With the benefit of this disclosure, one of ordinary skill in the art will be readily able to prepare an additive for winterizing a paraffin inhibitor solution.

In examples, the additive is added to a paraffin inhibitor solution. The paraffin inhibitor may be provided as a solution. If the paraffin inhibitor is provided as a solid, it may be added to a solvent and prepared as a solution. The paraffin inhibitors may be comb shape polymers having linear or branched side chains. The polymer backbone may have two or more three-way branch points. The side chains may be identical or different. These side chains may vary in length, but typically have carbon numbers greater than ten. The side chains may be connected to the polymer backbone by a polar group such as an amide, ester, imide, etc. Although the additive is described as interfering with the crystallization of comb polymer paraffin inhibitors, it is to be understood that the additive may be used with any species of paraffin inhibitor that may crystallize at low temperatures. These species may comprise other polymer shapes than comb and may include any branching or linear polymer that crystallizes at low temperatures and may be winterized by the disclosed additives. Examples of the paraffin inhibitors may include, but are not limited to, poly(alkylacrylate), poly(alkylmethacrylate), alkylacrylate/alkylmethacrylate copolymers, olefin-maleic anhydride derivatives such as ester derivative, amide derivative, imide derivative, maleic anhydride/(meth)acrylate copolymer derivatives, the like, or any combination thereof. Advantageously, the additive may be added to the paraffin inhibitor solution to reduce the pour point of the paraffin inhibitor without solidifying the paraffin inhibitor, molecularly modifying the paraffin inhibitor, or adding additional solvents to the paraffin inhibitor solution.

The additive may be added to the paraffin inhibitor solution in a concentration in a range of about 1% (w/w) to about 40% (w/w). The concentration of the additive in the paraffin inhibitor solution may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the additive in the paraffin inhibitor solution may be about 1% (w/w) to about 40% (w/w) of the paraffin inhibitor solution, about 3% (w/w) to about 40% (w/w) of the paraffin inhibitor solution, about 5% (w/w) to about 40% (w/w) of the paraffin inhibitor solution, about 7% (w/w) to about 40% (w/w) of the paraffin inhibitor solution, about 10% (w/w) to about 40% (w/w) of the paraffin inhibitor solution, about 15% (w/w) to about 40% (w/w) of the paraffin inhibitor solution, about 20% (w/w) to about 40% (w/w) of the paraffin inhibitor solution, about 25% (w/w) to about 40% (w/w) of the paraffin inhibitor solution, about 30% (w/w) to about 40% (w/w) of the paraffin inhibitor solution, or about 35% (w/w) to about 40% (w/w) of the paraffin inhibitor solution. Alternatively, the concentration of the additive in the paraffin inhibitor solution may be about 1% (w/w) to about 35% (w/w) of the paraffin inhibitor solution, about 1% (w/w) to about 30% (w/w) of the paraffin inhibitor solution, about 1% (w/w) to about 25% (w/w) of the paraffin inhibitor solution, about 1% (w/w) to about 20% (w/w) of the paraffin inhibitor solution, about 1% (w/w) to about 15% (w/w) of the paraffin inhibitor solution, about 1% (w/w) to about 10% (w/w) of the paraffin inhibitor solution, about 1% (w/w) to about 7% (w/w) of the paraffin inhibitor solution, about 1% (w/w) to about 5% (w/w) of the paraffin inhibitor solution, or about 1% (w/w) to about 3% (w/w) of the paraffin inhibitor solution With the benefit of this disclosure, one of ordinary skill in the art will be readily able to obtain and prepare a paraffin inhibitor solution comprising a sufficient concentration of the additive for a winterization application.

The additive may reduce the pour point of the paraffin inhibitor solution by an amount of at least 2° F. For example, the additive may reduce the pour point of the paraffin inhibitor solution from about 29° F. to about 2° F. As another example, the additive may reduce the pour point of the paraffin inhibitor solution from about −4° F. to about −10° F. Without limitation, the additive may reduce the pour point of the paraffin inhibitor solution about 2° F. to about 40° F., about 4° F. to about 40° F., about 6° F. to about 40° F., about 8° F. to about 40° F., about 10° F. to about 40° F., about 12° F. to about 40° F., about 14° F. to about 40° F., about 16° F. to about 40° F., about 18° F. to about 40° F., about 20° F. to about 40° F., about 22° F. to about 40° F., about 24° F. to about 40° F., about 26° F. to about 40° F., about 28° F. to about 40° F., about 30° F. to about 40° F., about 32° F. to about 40° F., about 34° F. to about 40° F., about 36° F. to about 40° F., or about 38° F. to about 40° F., and encompassing any temperature in-between the listed values.

The additive may contact the paraffin inhibitor solution at any time during any downhole and/or surface operation. In one example, the additive may be added to the paraffin inhibitor solution and then the paraffin inhibitor solution may be stored with or without subsequent mixing of the paraffin inhibitor solution. In another example, the additive may be added to the paraffin inhibitor solution immediately preceding the use of the paraffin inhibitor solution, for example, immediately prior to injection of the paraffin inhibitor solution into a wellbore or transport equipment. In yet another example, the additive may be added to the paraffin inhibitor solution simultaneously with the injection of the paraffin inhibitor solution into a wellbore or transport equipment. In still another example, the additive may be added to a wellbore or transport equipment in which the paraffin inhibitor solution has already been injected.

In some examples, the additive may contact the paraffin inhibitor solution and then be statically stored without mixing for a time of at least 1 hour. Without limitation, the additive may be added to the paraffin inhibitor solution and then statically stored without mixing for a time of at least about 1 hour, about 2 hours, about 3 hours, about 4 hours, about 5 hours, about 6 hours, about 7 hours, about 8 hours, about 9 hours, about 10 hours, about 11 hours, about 12 hours, about 24 hours, about 36 hours, about 48 hours, about 60 hours, about 72 hours, or longer and encompassing any length of time in-between the listed values.

When desired for use, the additive may be added to the paraffin inhibitor solution to provide the winterized paraffin inhibitor solution. The winterized paraffin inhibitor solution may be formulated to reduce the pour point of the paraffin inhibitor solution to the desired pour point temperature threshold. The winterized paraffin inhibitor solution may then be introduced into a wellbore or into transportation equipment for downstream transport of hydrocarbon fluids. In some examples, the winterized paraffin inhibitor solution may be stored prior to use. Said storage may occur with or without mixing of the winterized paraffin inhibitor solution. In some examples, the storage may occur at temperatures below the pour point of the un-winterized paraffin inhibitor solution.

As described herein, the winterized paraffin inhibitor solution may reduce or prevent the deposition of paraffin on production equipment, in the wellbore, or in transportation equipment as compared to a paraffin inhibitor solution which has not been winterized. In some other examples, the winterized paraffin inhibitor solution may reduce or prevent the deposition of paraffin on production equipment, in the wellbore, or in transportation equipment at temperatures below the pour point of the un-winterized paraffin inhibitor solution.

Example systems as disclosed herein may be used to mix a additive with a paraffin inhibitor solution and to inject the winterized paraffin inhibitor solution into a wellbore or transportation equipment. The example systems may comprise a pump coupled to a tubular. The tubular may be disposed in a wellbore or may be a type of transport equipment, for example, a pipeline used to transport hydrocarbon fluids to a downstream location such as a refinery. The pump may be a high-pressure pump or a low-pressure pump. As used herein, the term "high pressure pump" will refer to a pump that operates at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the winterized paraffin inhibitor solution is formulated. In various examples, the pump (e.g., a low-pressure pump, a high-pressure pump, or a combination thereof) may convey the winterized paraffin inhibitor solution from the mixing tank to the transporting conduit. In other examples, the winterized paraffin inhibitor may be formulated offsite and transported to a worksite, in which case the winterized paraffin inhibitor solution may be introduced to the transporting conduit via the pump either directly from its shipping container (e.g., a truck, a railcar, a barge, or the like) or from a transport pipeline. In either case, the winterized paraffin inhibitor solution may be drawn into the pump, elevated to an appropriate pressure, and then introduced into the transporting conduit for delivery downhole or to a downstream location such as a refinery.

Referring now to FIG. 1, a schematic illustrating mixing equipment 4 and pumping equipment 6 for the winterized paraffin inhibitor solution comprising the additive and the paraffin inhibitor solution is illustrated in accordance with the examples disclosed herein. FIG. 1 illustrates a system 2 for preparation of and injection of a winterized paraffin inhibitor solution comprising the additive and the paraffin inhibitor solution. The additive and the paraffin inhibitor solution may be added to and mixed in the mixing equipment 4 to provide the winterized paraffin inhibitor solution. The mixing equipment 4 may be any mixer sufficient for mixing the additive and the paraffin inhibitor solution. Examples of the mixing equipment 4 may include, but are not limited to, a jet mixer, re-circulating mixer, a batch mixer, and the like. In some examples, the mixing equipment 4 may be a jet mixer and may continuously mix the winterized paraffin inhibitor solution as it is pumped to the wellbore. The additive may be added to the mixing equipment 4 first or, alternatively, the paraffin inhibitor solution may be added to the mixing equipment 4 first. In some examples, the winterized paraffin inhibitor solution may be formulated in mixing equipment 4 such that the components of the winterized paraffin inhibitor solution may be added to the mixing equipment 4 in any order and mixed to provide the desired winterized paraffin inhibitor solution formulation.

After the winterized paraffin inhibitor solution has been mixed in mixing equipment 4, the winterized paraffin inhibitor solution may be pumped to the wellbore or a pipeline via pumping equipment 6. In some examples, the mixing equipment 4 and the pumping equipment 6 may be disposed on other pieces of wellbore equipment and/or transport equipment as will be apparent to those of ordinary skill in the art. Examples of pumping equipment 6 include, but are not limited to, floating piston pumps, positive displacement pumps, centrifugal pumps, peristaltic pumps, diaphragm pumps, and the like.

Figure 2:
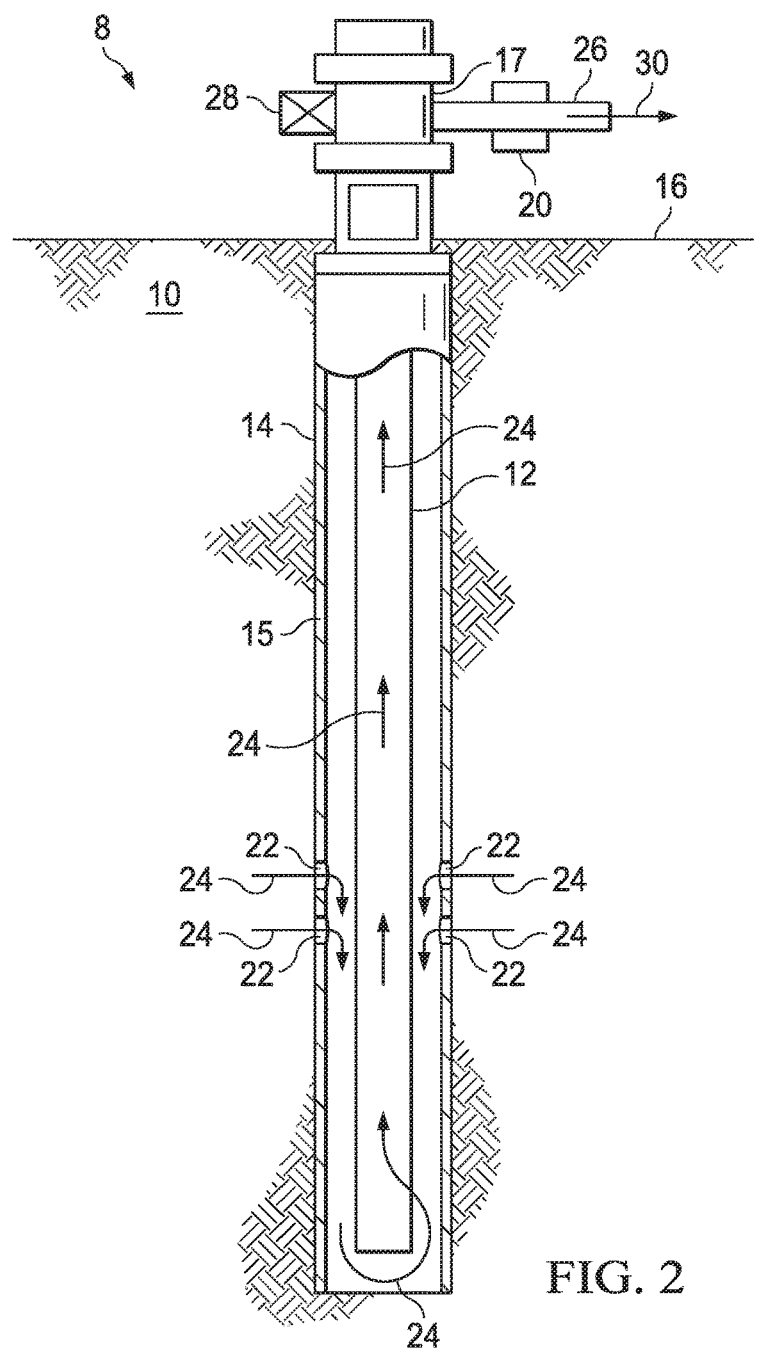
FIG. 2 is a schematic illustrating a hydrocarbon production system for the production of hydrocarbon fluids and the injection of a winterized paraffin inhibitor solution in accordance with the examples disclosed herein.

Referring now to FIG. 2, a schematic illustrating a hydrocarbon production system 8 for the production of hydrocarbon fluids and the injection of the winterized paraffin inhibitor solution is illustrated in accordance with the examples disclosed herein. The system 8 may include a tubular 12 disposed in a wellbore 14 that penetrates a subterranean formation 10, and the tubular 12 may be adapted to convey fluids, for example, hydrocarbon fluids, from the subterranean formation 10 to a surface location 16 in the direction generally indicated by arrows 24.

The tubular 12 may be an appropriate tubular completion member configured for transporting fluids. For example, the tubular 12 may be jointed production tubing, coiled tubing, production tubing, or similar conduit lengths and types.

A wellhead 17 may be disposed proximal to the surface location 16. The wellhead 17 may be operatively coupled to a casing 15 that extends a substantial portion of the length of the wellbore's 14 surface location 16 towards the subterranean formation 10. In some instances, the casing 15 may terminate at or above a particular zone of the subterranean formation 10, thereby leaving the wellbore 14 uncased through the remainder of the subterranean formation 10, which is commonly referred to as "open hole." In other instances, as illustrated, the casing 15 may extend through the subterranean formation 10 and may include apertures 22 either formed prior to installing the casing 15 or otherwise by downhole perforating operations to allow fluid communication between the interior of the wellbore 14 and the subterranean formation 10. Some, all, or none of the casing 15 may be affixed to the adjacent subterranean formation 10 with a cement sheath or the like.

The winterized paraffin inhibitor solution, as disclosed herein, may be injected into the wellbore 14 at injection point 28. The injection point 28 may comprise pumping equipment, and in some optional examples, may comprise mixing equipment (e.g., pumping equipment 6 and mixing equipment 4, as illustrated in FIG. 1) that may be used to inject the winterized paraffin inhibitor solution into the wellbore 14. The winterized paraffin inhibitor solution may then mix with any produced wellbore fluids, for example, hydrocarbon fluids flowing in the direction of arrows 24. These hydrocarbon fluids may comprise dissolved wax, such as paraffin, that may precipitate under specific conditions. The winterized paraffin inhibitor solution may be used to prevent or reduce the deposition of paraffin in the wellbore 14, as well as in production equipment and transport equipment.

In addition to, or alternatively, the winterized paraffin inhibitor solution, as disclosed herein, may be injected into the wellbore 14 at injection point 20. The injection point 20 may comprise pumping equipment, and in some examples, may also comprise mixing equipment (e.g., pumping equipment 6 and mixing equipment 4, as illustrated in FIG. 1) that may be used to inject the winterized paraffin inhibitor solution into the transporting tubular 26. Transporting tubular 26 may be separate from, or may be a transporting tubular of a pipeline that may convey produced hydrocarbon fluids flowing in the direction of arrow 30 to a downstream location (e.g., a refinery) for processing. The winterized paraffin inhibitor solution may then mix with any produced hydrocarbon fluids comprising dissolved wax. The winterized paraffin inhibitor solution may be used to prevent or reduce the deposition of paraffin in the transporting tubular 26 and any other pipeline or transporting equipment as well as downstream processing equipment such as refinery equipment.

In the foregoing system 8 of FIG. 2, wellbore 14 is a substantially vertical wellbore 14 extending from the surface location 16 into the subterranean formation 10. However, the systems and methods described herein may also be used with other wellbore configurations (e.g., deviated wellbores, horizontal wellbores, multilateral wellbores, and other configurations).

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

It is also to be recognized that the disclosed winterized paraffin inhibitor solutions may also directly or indirectly affect the various downhole equipment and tools that may come into contact with the winterized paraffin inhibitor solutions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1 and 2.

Provided are compositions for winterized paraffin inhibitor solutions in accordance with the disclosure and the illustrated FIGs. An example composition comprises a paraffin inhibitor solution; and an additive comprising a first portion and a second portion; wherein the first portion is selected from the functional groups consisting of sulfo, phosphate, phosphonate, ester, carboxyl, hydroxyl, and any combination thereof; wherein the second portion is selected from the functional groups consisting of linear alkyl, branched alkyl, alkyl phenyl, ethoxylated branched alkyl, propoxylated branched alkyl, and any combination thereof.

Additionally or alternatively, the composition may include one or more of the following features individually or in combination. The additive may be selected from the group consisting of dodecylbenzenesulfonic acid, methanesulfonic acid, ethanesulfonic acid, nonylphenol, and any combination thereof. The paraffin inhibitor solution may comprise a paraffin inhibitor that is a solute of the winterized paraffin inhibitor solution. The additive may be present in the winterized paraffin inhibitor solution in a concentration in a range of about 1% (w/w) to about 40% (w/w). The paraffin inhibitor solution may comprise a paraffin inhibitor that is a comb shape polymer. The winterized paraffin inhibitor solution may comprise a pour point of at least 2° F. less than the paraffin inhibitor solution.

Provided are methods for reducing paraffin deposition in accordance with the disclosure and the illustrated FIGs. An example method comprises preparing a winterized paraffin inhibitor solution by introducing an additive to a paraffin inhibitor solution; wherein the additive comprises: a first portion selected from the functional groups consisting of sulfo, phosphate, phosphonate, ester, carboxyl, hydroxyl, and any combination thereof; and a second portion selected from the functional groups consisting of linear alkyl, branched alkyl, alkyl phenyl, ethoxylated branched alkyl, propoxylated branched alkyl, and any combination thereof. The method further comprises contacting a hydrocarbon fluid with the winterized paraffin inhibitor solution.

Additionally or alternatively, the method may include one or more of the following features individually or in combination. Contacting the hydrocarbon fluid with the winterized paraffin inhibitor solution may occur in a wellbore or a conduit located on a ground surface. Contacting the hydrocarbon fluid with the winterized paraffin inhibitor solution may occur at a temperature below the pour point of the paraffin inhibitor solution. The method may further comprise statically storing the winterized paraffin inhibitor solution without mixing for a time of at least about 1 hour prior to the contacting the hydrocarbon fluid with the winterized paraffin inhibitor solution. The additive may be selected from the group consisting of dodecylbenzenesulfonic acid, methanesulfonic acid, ethanesulfonic acid, nonylphenol, and any combination thereof. The paraffin inhibitor solution may comprise a paraffin inhibitor that is a solute of the winterized paraffin inhibitor solution. The additive may be present in the winterized paraffin inhibitor solution in a concentration in a range of about 1% (w/w) to about 40% (w/w). The paraffin inhibitor solution may comprise a paraffin inhibitor that is a comb shape polymer. The winterized paraffin inhibitor solution may comprise a pour point of at least 2° F. less than the paraffin inhibitor solution.

Provided are systems for reducing paraffin deposition in accordance with the disclosure and the illustrated FIGs. An example system comprises a winterized paraffin inhibitor solution composition comprising: a paraffin inhibitor solution; and an additive comprising a first portion and a second portion; wherein the first portion is selected from the functional groups consisting of sulfo, phosphate, phosphonate, ester, carboxyl, hydroxyl, and any combination thereof; wherein the second portion is selected from the functional groups consisting of linear alkyl, branched alkyl, alkyl phenyl, ethoxylated branched alkyl, propoxylated branched alkyl, and any combination thereof. The system further comprises mixing equipment capable of mixing the paraffin inhibitor solution and the additive to provide the winterized paraffin inhibitor solution; and pumping equipment capable of delivering the winterized paraffin inhibitor solution into a conduit.

Additionally or alternatively, the system may include one or more of the following features individually or in combination. The system may further comprise the conduit and the conduit may be capable of transporting hydrocarbon fluids. The conduit may be located in a wellbore or on a ground surface. The temperature within the conduit may be a temperature below the pour point of the paraffin inhibitor solution. The additive may be selected from the group consisting of dodecylbenzenesulfonic acid, methanesulfonic acid, ethanesulfonic acid, nonylphenol, and any combination thereof. The paraffin inhibitor solution may comprise a paraffin inhibitor that is a solute of the winterized paraffin inhibitor solution. The additive may be present in the winterized paraffin inhibitor solution in a concentration in a range of about 1% (w/w) to about 40% (w/w). The paraffin inhibitor solution may comprise a paraffin inhibitor that is a comb shape polymer. The winterized paraffin inhibitor solution may comprise a pour point of at least 2° F. less than the paraffin inhibitor solution.

EXAMPLES

The present disclosure may be better understood by reference to the following examples, which are offered by way of illustration. The present disclosure is not limited to the examples provided herein.

Example 1

Example 1 illustrates an experiment to test the winterization effectiveness of various examples of the additive against un-winterized control paraffin inhibitor solutions. The winterized paraffin inhibitor solutions were prepared according to the formulations present in Table 1. All samples were placed at the specified temperatures for at least 24 hours.

TABLE 1

Reduction of Pour Point in Paraffin Inhibitor Solutions

| Paraffin Inhibitor Solution Example | Concentration of Paraffin Inhibitor in Final Solution | Additive | Concentration of Additive | Measured Pour Point (° F.) |
|---|---|---|---|---|
| Example A | 20 wt. % | None | — | 27 |
| Example A | 10 wt. % | None | — | 20 |
| Example A | 20 wt. % | Dodecylbenzenesulfonic acid | 14 wt. % | <−20 |
| Example A | 10 wt. % | Ethanesulfonic acid | 7.5 wt. % | <−20 |
| Example A | 10 wt. % | Nonylphenol | 10 wt. % | −20-0 |
| Example B | 17 wt. % | None | — | 29 |
| Example B | 17 wt. % | Dodecylbenzenesulfonic acid | 17 wt. % | 2-3 |
| Example C | 22 wt. % | None | — | −4 |
| Example C | 22 wt. % | Dodecylbenzenesulfonic acid | 17 wt. % | −20--10 |
| Example C | 22 wt. % | Nonylphenol | 22 wt. % | −20--10 |

As the results of Example 1 illustrate, the example additives were able to reduce the pour point of the paraffin inhibitor solutions. One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for reducing paraffin deposition comprising:
    preparing a winterized paraffin inhibitor solution by introducing an additive to a paraffin inhibitor solution;
        wherein the additive is selected from the group consisting of methanesulfonic acid, ethanesulfonic acid, nonylphenol, and any combination thereof;
        wherein the paraffin inhibitor solution comprises a paraffin inhibitor that is a solute of the winterized paraffin inhibitor solution; and
    contacting a hydrocarbon fluid with the winterized paraffin inhibitor solution.

2. The method of claim 1, wherein the contacting the hydrocarbon fluid with the winterized paraffin inhibitor solution occurs in a wellbore or a conduit located on a ground surface.

3. The method of claim 1, wherein the contacting the hydrocarbon fluid with the winterized paraffin inhibitor solution occurs at a temperature below a pour point of the paraffin inhibitor solution.

4. The method of claim 1, further comprising statically storing the winterized paraffin inhibitor solution without mixing for a time of at least about 1 hour prior to the contacting the hydrocarbon fluid with the winterized paraffin inhibitor solution.

5. The method of claim 1, wherein the additive is present in the winterized paraffin inhibitor solution in a concentration in a range of about 1% (w/w) to about 40% (w/w).

6. The method of claim 1, wherein the paraffin inhibitor solution comprises a paraffin inhibitor that is a comb shape polymer.

7. The method of claim 6, wherein the paraffin inhibitor comprises a linear side chain.

8. The method of claim 6, wherein the paraffin inhibitor comprises a branched side chain.

9. The method of claim 1, wherein the winterized paraffin inhibitor solution comprises a pour point of at least 2° F. less than the paraffin inhibitor solution.

10. The method of claim 1, wherein the paraffin inhibitor comprises a polymer backbone having at least two three-way branch points.

11. The method of claim 1, wherein the paraffin inhibitor comprises a side chain with a carbon number greater than ten.

12. The method of claim 1, wherein the paraffin inhibitor comprises a polymer backbone and a sidechain connected to the polymer backbone by a polar group.

13. The method of claim 1, wherein the paraffin inhibitor is selected from the group consisting of poly(alkylacrylate), poly(alkylmethacrylate), alkylacrylate/alkylmethacrylate copolymers, an ester derivative, an amide derivative, an imide derivative, a maleic anhydride/(meth)acrylate copolymer derivative, and any combinations thereof.

14. The method of claim 1, wherein the element of preparing a winterized paraffin inhibitor solution by introducing an additive to a paraffin inhibitor solution further comprises adding the additive to the paraffin inhibitor solution prior to injection of the paraffin inhibitor solution into a wellbore or transport equipment.

15. The method of claim 1, wherein the element of preparing a winterized paraffin inhibitor solution by introducing an additive to a paraffin inhibitor solution further comprises adding the additive to the paraffin inhibitor solution simultaneously with the injection of the paraffin inhibitor solution into a wellbore or transport equipment.

16. The method of claim 1, wherein the element of preparing a winterized paraffin inhibitor solution by introducing an additive to a paraffin inhibitor solution further comprises adding the additive to a wellbore or transport equipment in which the paraffin inhibitor solution has already been injected.

17. The method of claim 1, wherein the hydrocarbon fluid is disposed in a wellbore, and wherein the winterized paraffin inhibitor fluid is pumped in the wellbore.

18. The method of claim 1, wherein the hydrocarbon fluid comprises dissolved wax.

19. The method of claim 1, wherein the hydrocarbon fluid is disposed in a pipeline, and wherein the winterized paraffin inhibitor fluid is pumped in the pipeline.

20. The method of claim 1, wherein the additive is present in the winterized paraffin inhibitor solution in a concentration in a range of about 1% (w/w) to about 20%(w/w).

* * * * *